United States Patent
Zhang et al.

(10) Patent No.: US 9,204,355 B2
(45) Date of Patent: Dec. 1, 2015

(54) CELL RESELECTION METHOD AND MOBILE TERMINAL

(71) Applicant: Huawei Device Co., Ltd., Shenzhen (CN)

(72) Inventors: Zhangong Zhang, Shenzhen (CN); Konggang Wei, Shenzhen (CN); Yu Deng, Shanghai (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 361 days.

(21) Appl. No.: 13/755,544

(22) Filed: Jan. 31, 2013

(65) Prior Publication Data

US 2014/0057631 A1    Feb. 27, 2014

(30) Foreign Application Priority Data

May 25, 2012    (CN) .......................... 2012 1 0165544

(51) Int. Cl.
*H04W 36/00* (2009.01)
*H04W 4/00* (2009.01)
(Continued)

(52) U.S. Cl.
CPC ............. *H04W 36/30* (2013.01); *H04W 48/02* (2013.01); *H04W 48/20* (2013.01); *Y02B 60/50* (2013.01)

(58) Field of Classification Search
CPC .. H04W 36/08; H04W 36/14; H04W 36/0061
USPC .......................................... 455/436; 370/331
See application file for complete search history.

(56) References Cited

U.S. PATENT DOCUMENTS

2008/0188215 A1 * 8/2008 Bergstrom et al. ........... 455/424
2008/0280604 A1   11/2008 Ore et al.
(Continued)

FOREIGN PATENT DOCUMENTS

CN    101547495 A    9/2009
CN    101637048 A    1/2010
(Continued)

OTHER PUBLICATIONS

3rd Generation Partnership Project, "Technical Specification Group Radio Access Network; User Equipment (UE) Procedures in Idle Mode and Procedures for Cell Reselection in Connected Mode" (Release 10) 3GPP TS 25.304. V10.1.0, Jun. 2011.

(Continued)

*Primary Examiner* — Omoniyi Obayanju
(74) *Attorney, Agent, or Firm* — Huawei Device Co., Ltd.

(57) ABSTRACT

Embodiments of the present invention provide a cell reselection method and a mobile terminal. In the embodiments of the present invention, whether a cell where signal measurement needs to be performed exists is determined according to a neighboring cell list and a reselection prohibited list; if a cell where signal measurement needs to be performed exists, signal measurement is performed on the cell where signal measurement needs to be performed and a current serving cell to obtain a measurement result; and if the measurement result satisfies a trigger condition of cell reselection, cell reselection is triggered. Therefore, when cell reselection needs to be performed, signal measurement is no longer performed on a cell in the reselection prohibited list and unnecessary signal measurement and cell reselection are avoided, thereby decreasing power consumption of a mobile terminal and prolonging standby time of the mobile terminal.

20 Claims, 1 Drawing Sheet

(51) Int. Cl.
*H04W 36/30* (2009.01)
*H04W 48/02* (2009.01)
*H04W 48/20* (2009.01)

(56) References Cited

U.S. PATENT DOCUMENTS

| | | |
|---|---|---|
| 2009/0245176 A1* | 10/2009 | Balasubramanian et al. ... 370/328 |
| 2010/0279693 A1 | 11/2010 | Hole |
| 2012/0034878 A1 | 2/2012 | Findlay et al. |
| 2012/0040621 A1 | 2/2012 | Jung et al. |
| 2012/0275371 A1 | 11/2012 | Somasundaram et al. |

FOREIGN PATENT DOCUMENTS

| | | |
|---|---|---|
| CN | 101984711 A | 3/2011 |
| CN | 102685838 A | 9/2012 |
| JP | 2013-535927 | 9/2012 |
| WO | WO 2011/101049 A1 | 8/2011 |
| WO | 2012/021003 A2 | 2/2012 |

OTHER PUBLICATIONS

International Search Report issued in corresponding PCT Patent Application No. PCT/CN2013/070406, mailed Apr. 25, 2013, 12 pages.

* cited by examiner

CELL RESELECTION METHOD AND MOBILE TERMINAL

CROSS-REFERENCE TO RELATED APPLICATIONS

This application claims priority to Chinese Patent Application No. 201210165544.4, filed on May 25, 2012, which is hereby incorporated by reference in its entirety.

FIELD OF THE INVENTION

The present invention relates to the field of communications technologies, and in particular, to a cell reselection method and a mobile terminal.

BACKGROUND OF THE INVENTION

At present, a mobile terminal such as a smart phone, a data card, and a tablet computer with a mobile communication function generally has a modem. In an idle state, the modem searches a network periodically according to a cell reselection criterion, measures a signal of a neighboring cell and selects a currently optimal cell, so that the mobile terminal camps on the currently optimal cell.

However, an existing cell reselection method may make a mobile terminal perform cell reselection frequently, thereby causing power consumption of the mobile terminal, and shortening standby time of the mobile terminal.

SUMMARY OF THE INVENTION

Embodiments of the present invention provide a cell reselection method and a mobile terminal, so as to decrease power consumption of a mobile terminal and prolong standby time of the mobile terminal.

In one aspect, an embodiment of the present invention provides a cell reselection method, including:

determining, according to a neighboring cell list and a reselection prohibited list, whether a cell where signal measurement needs to be performed exists;

if a cell where signal measurement needs to be performed exists, performing signal measurement on the cell where signal measurement needs to be performed and a current serving cell to obtain a measurement result; and if the measurement result satisfies a trigger condition of cell reselection, triggering cell reselection;

where the neighboring cell list refers to a list formed by neighboring cells of the current serving cell; and the reselection prohibited list refers to a list formed by cells where cell reselection is prohibited.

In another aspect, an embodiment of the present invention provides a mobile terminal, including a processor and a modem, where:

the processor is configured to determine, according to a neighboring cell list and a reselection prohibited list, whether a cell where signal measurement needs to be performed exists;

the modem is configured to, if the processor determines that a cell where signal measurement needs to be performed exists, perform signal measurement on the cell where signal measurement needs to be performed and a current serving cell to obtain a measurement result; and the processor is further configured to judge, according to the measurement result of the modem, whether a trigger condition of cell reselection is satisfied, and if the trigger condition is satisfied, trigger cell reselection executed by the modem;

where the neighboring cell list refers to a list formed by neighboring cells of the current serving cell; and the reselection prohibited list refers to a list formed by cells where cell reselection is prohibited.

In the embodiments of the present invention, whether a cell where signal measurement needs to be performed exists is determined according to a neighboring cell list and a reselection prohibited list; if a cell where signal measurement needs to be performed exists, signal measurement is performed on the cell where signal measurement needs to be performed and a current serving cell to obtain a measurement result; and if the measurement result satisfies a trigger condition of cell reselection, cell reselection is triggered. Therefore, when cell reselection needs to be performed, signal measurement is no longer performed on a cell in the reselection prohibited list and unnecessary signal measurement and cell reselection are avoided, thereby decreasing power consumption of a mobile terminal and prolonging standby time of the mobile terminal.

BRIEF DESCRIPTION OF THE DRAWINGS

To describe the technical solutions in the embodiments of the present invention more clearly, the accompanying drawings required for describing the embodiments or the prior art are briefly introduced in the following. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present invention more comprehensible, the technical solutions in the embodiments of the present invention are described clearly in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

The technical solutions of the present invention may be applied to various mobile communication systems, such as a global system for mobile communications (Global System for Mobile Communications, GSM for short), a general packet radio service (General Packet Radio Service, GPRS for short) system, a code division multiple access (Code Division Multiple Access, CDMA for short) system, a CDMA2000 system, a wideband code division multiple access (Wideband Code Division Multiple Access, WCDMA for short) system, a long term evolution (Long Term Evolution, LTE for short) system, or a world interoperability for microwave access (World Interoperability for Microwave Access, WiMAX for short) system.

Figure 1:
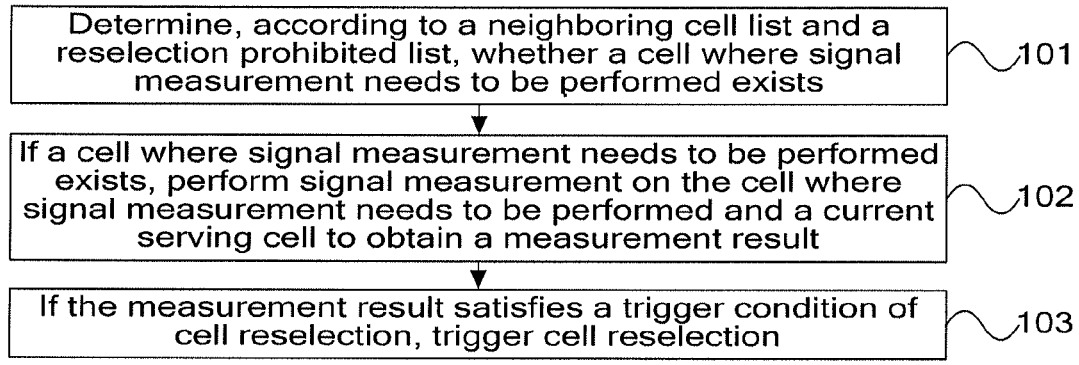
FIG. 1 is a schematic flow chart of a cell reselection method according to an embodiment of the present invention.

FIG. 1 is a schematic flow chart of a cell reselection method according to an embodiment of the present invention. As shown in FIG. 1, the cell reselection method in this embodiment of the present invention includes:

101: Determine, according to a neighboring cell list and a reselection prohibited list, whether a cell where signal measurement needs to be performed exists.

In the embodiments of the present invention, a cell means that, in mobile communication, all areas that need to be covered are divided into several parts, namely divided into different cells, and generally one base station is divided into three cells.

A current serving cell refers to a cell that currently establishes a connection to a mobile terminal, and the mobile terminal sends and receives data information through the cell.

A neighboring cell refers to at least two cells covered with an overlapping part, and one cell may have multiple neighboring cells. When a mobile terminal is connected to a current serving cell, the mobile terminal receives neighboring cell information of the current serving cell, where the neighboring cell information is delivered by a network side, and the mobile terminal generates a neighboring cell list according to the neighboring cell information. That is, the neighboring cell list refers to a list formed by neighboring cells of the current serving cell, and the neighboring cell list may be formed by identifiers of the neighboring cells of the current serving cell.

When the mobile terminal is in an idle state, a process that the mobile terminal is handed over from the current serving cell to a preferable cell is cell reselection. The reselection prohibited list refers to a list of cells where cell reselection is prohibited, and the reselection prohibited list may be formed by identifiers of the cells where cell reselection is prohibited.

The mobile terminal determines, according to the neighboring cell list and the reselection prohibited list, whether a cell where signal measurement needs to be performed exists.

Specifically, the mobile terminal reads a neighboring cell list, judges whether a cell in the neighboring cell list is included in a reselection prohibited list, and if the cell in the neighboring cell list is not included in the reselection prohibited list, determines that a cell where signal measurement needs to be performed exists, where the cell where signal measurement needs to be performed refers to a cell that is in the neighboring cell list but is not included in the reselection prohibited list; and if cells in the neighboring cell list are all included in the reselection prohibited list, determines that a cell where signal measurement needs to be performed does not exist.

Alternatively, the mobile terminal reads a reselection list, judges whether the reselection list includes a cell in a neighboring cell list, and if the reselection list includes a cell in the neighboring cell list, determines that a cell where signal measurement needs to be performed exists, where the cell where signal measurement needs to be performed refers to a cell in the reselection list; and if the reselection list does not include a cell in the neighboring cell list, determines that a cell where signal measurement needs to be performed does not exist. The reselection list is determined according to the neighboring cell list and a reselection prohibited list; and the cell in the reselection list is a cell that is included in the neighboring cell list but is not included in the reselection prohibited list. Specifically, a method for determining the reselection list may be: reading a neighboring cell list, judging whether a cell in the neighboring cell list is included in a reselection prohibited list, and if the cell in the neighboring cell list is not included in the reselection prohibited list, adding the cell in the neighboring cell list to the reselection list.

102: If a cell where signal measurement needs to be performed exists, perform signal measurement on the cell where signal measurement needs to be performed and a current serving cell to obtain a measurement result.

If in step 101, it is determined that a cell where signal measurement needs to be performed exists, signal measurement is performed on the cell where signal measurement needs to be performed and a current serving cell.

An implementation manner for judging whether a cell where signal measurement needs to be performed exists and performing signal measurement on the cell where signal measurement needs to be performed, specifically may be: The mobile terminal reads one cell in the neighboring cell list, judges whether the cell is included in the reselection prohibited list, if the cell is not included in the reselection prohibited list, performs signal measurement on the cell, and if the cell is included in the reselection prohibited list, does not perform signal measurement on the cell; and then reads a next cell in the neighboring cell list, and performs the same processing until all cells in the neighboring cell list are processed completely, thereby obtaining measurement results of all cells where signal measurement needs to be performed.

Alternatively, it may be that the mobile terminal reads one cell in the neighboring cell list, judges whether the cell is included in the reselection prohibited list, if the cell is not included in the reselection prohibited list, adds the cell to a temporary list, and if the cell is included in the reselection prohibited list, does not add the cell to the temporary list; then reads a next cell in the neighboring cell list, and performs the same processing, until all cells in the neighboring cell list are processed completely; and sequentially reads cells in the temporary list and performs signal measurement on the cells in the temporary list, thereby obtaining measurement results of all cells where signal measurement needs to be performed. The temporary list may be a cache list.

Alternatively, it may be that the mobile terminal reads one cell in the reselection list, performs signal measurement on the cell; and then reads a next cell in the reselection list, and performs signal measurement on the next cell, until signal measurement is performed on all cells in the reselection list, thereby obtaining measurement results of all cells where signal measurement needs to be performed.

Preferably, the signal measurement may include signal intensity measurement and signal quality measurement.

The signal intensity is used to indicate the size of a received signal, for example, a signal level value is used to indicate the signal intensity. For example, if a signal level value of a certain cell is measured as −67 dbm, it may be considered that the signal intensity of the certain cell is −67 dbm. The larger the signal intensity is, the better the signal is. For example, China Mobile stipulates that, when a received signal level value>=(city is −90 dbm; and country is −94 dbm), a signal coverage requirement is satisfied.

The signal quality is used to indicate the quality of a received signal, which may be understood as the purity degree of a signal. When a signal level value of the received signal is large, but includes many noises, a signal quality value of the received signal may also be small and the signal quality of the received signal is poor. A general calculation method of the signal quality value is: signal quality value=received signal code power/received signal intensity indicator.

It may be understood that, performing signal measurement may only indicate measuring the signal intensity, or only indicate measuring the signal quality, or indicate measuring both the signal intensity and the signal quality. Definitely, it may be understood that, other values that may indicate signal characteristics may also be measured, such as signal power and signal stability, which is not specifically limited herein.

If in step 101, it is determined that a cell where signal measurement needs to be performed does not exist, cell signal measurement is not performed.

103: If the measurement result satisfies a trigger condition of cell reselection, trigger cell reselection.

For example, whether the trigger condition of cell reselection is satisfied may be judged according to the signal intensity and the signal quality. Specifically, a signal intensity threshold and a signal quality threshold may be preset. When the signal intensity obtained through measurement is higher than the signal intensity threshold, and the signal quality obtained through measurement is higher than the signal quality threshold, it is determined that the measurement result satisfies the trigger condition of cell reselection, and cell reselection is triggered.

It may be understood that, whether the trigger condition of cell reselection is satisfied may also be judged only according to the signal intensity or the signal quality, or according to other values that may indicate signal characteristics, such as signal power and signal stability, which is not specifically limited herein.

Optionally, before the step 101, generating or updating the reselection prohibited list may further be included. Specifically, the reselection prohibited list may be generated or updated according to the following rules, including:

(1) Add a cell where N times of reselection still does not succeed to the reselection prohibited list, where N is a positive integer that is greater than or equal to a first threshold.

For example: if the signal intensity and the signal quality of a cell A both satisfy the trigger condition of cell reselection, and cell reselection is executed, but due to some reasons (for example the cell capacity is limited, or the mobile terminal has no access permission), many times (such as 5 times) of cell reselection for the cell A does not succeed, and the number of unsuccessful reselection times (such as 5 times) is greater than the first threshold (such as 3 times), and then an identifier of the cell A is added to the reselection prohibited list.

In this way, signal measurement is no longer performed on some cells that satisfy the trigger condition of cell reselection but actually fail in executing the cell reselection, and the cell reselection is no longer executed, thereby avoiding unnecessary cell reselection, decreasing power consumption of the mobile terminal and prolonging standby time of the mobile terminal.

(2) If within set time, M times of reselection are performed on the current serving cell and a part of cells in the neighboring cell list, add other cells except a cell with the best signal stability among the current serving cell and the part of the cells in the neighboring cell list to the reselection prohibited list, where M is a positive integer that is greater than or equal to a second threshold.

(3) If within set time, M times of reselection are performed on the current serving cell and all cells in the neighboring cell list, and the signal stability of the current serving cell is not the best among the current serving cell and all the cells in the neighboring cell list, add other cells except a cell with the best signal stability among the current serving cell and all the cells in the neighboring cell list to the reselection prohibited list, where M is a positive integer that is greater than or equal to a second threshold.

(4) If within set time, M times of reselection are performed on the current serving cell and all cells in the neighboring cell list, and the signal stability of the current serving cell is the best among the current serving cell and all the cells in the neighboring cell list, add all the cells in the neighboring cell list to the reselection prohibited list, where M is a positive integer that is greater than or equal to a second threshold.

In the foregoing cases of (2), (3) and (4), the signal stability refers to a stable condition of the signal quality, which is generally indicated by a variance of the signal quality, and the smaller the variance is, the better the signal stability is.

For example, due to a factor such as cell signal instability, M times (for example, 5 times) of reselection is performed on the current serving cell and the cells in the neighboring cell list within set time (for example, 3 minutes), and the number of reselection times (for example, 5 times) is greater than the second threshold (for example 3 times), and then identifiers of other cells except a cell with the best signal stability among the current serving cell and the cells in the neighboring cell list are added to the reselection prohibited list.

In this way, when a cell signal is unstable and cell reselection is performed among several cells frequently, a cell with the best signal stability is reserved, and other cells are added to the reselection prohibited list, so that the mobile terminal camps on a relatively stable cell, signal measurement is no longer performed on other relatively unstable cells, and cell reselection is no longer executed, thereby avoiding unnecessary signal measurement and cell reselection, decreasing power consumption of the mobile terminal and prolonging standby time of the mobile terminal.

(5) If the signal intensity of the current serving cell is higher than set intensity, and the signal quality of the current serving cell is better than set quality, add all cells in the neighboring cell list to the reselection prohibited list.

For example, when a signal of the current serving cell is quite good, the signal intensity of the signal is higher than a set intensity threshold, and the signal quality is higher than a set quality threshold, identifiers of all the cells in the neighboring cell list may be added to the reselection prohibited list.

In this way, when the signal of the current serving cell is enough to satisfy a signal requirement of the mobile terminal, by adding all the cells in the neighboring cell list to the reselection prohibited list, signal measurement may no longer be performed on the cells in the neighboring cell list, and cell reselection may no longer be executed, thereby avoiding unnecessary signal measurement and cell reselection, decreasing power consumption of the mobile terminal and prolonging standby time of the mobile terminal.

(6) If the cell where signal measurement needs to be performed exists, and the measurement result of the cell satisfies the trigger condition of cell reselection, and the cell reselection is executed, but a process of executing cell reselection on all cells that satisfy the trigger condition of cell reselection does not succeed (for example, the cell capacity is limited, or the mobile terminal has no access permission), a cell in the reselection prohibited list is deleted from the reselection prohibited list. It may be understood that, when other cells in the neighboring cell list except the cell in the reselection prohibited list (namely, cells in the reselection list) all fail in executing the cell reselection, the cell in the reselection prohibited list is deleted from the reselection prohibited list. That is, the reselection list is emptied, and in this way, when cell reselection is performed next time, signal measurement is performed on all cells in the neighboring cell list.

Specifically, for the reselection prohibited list that is updated according to the foregoing rules (1), (2), (3) and (6), it may be determined, according to the neighboring cell list and the reselection prohibited list, that a cell where signal measurement needs to be performed exists, and therefore, signal measurement needs to be performed.

For the reselection prohibited list that is updated according to the foregoing rules (4) and (5), it may be determined, according to the neighboring cell list and the reselection prohibited list, that a cell where signal measurement needs to be performed does not exist, and therefore, signal measurement does not need to be performed and the current serving cell may continue to be used.

In this embodiment of the present invention, whether a cell where signal measurement needs to be performed exists is determined according to a neighboring cell list and a reselection prohibited list; if a cell where signal measurement needs to be performed exists, signal measurement is performed on the cell where signal measurement needs to be performed and a current serving cell to obtain a measurement result; and if the measurement result satisfies a trigger condition of cell reselection, cell reselection is triggered. Therefore, when cell reselection needs to be performed, signal measurement is no longer performed on a cell in the reselection prohibited list and unnecessary signal measurement and cell reselection are avoided, thereby decreasing power consumption of a mobile terminal and prolonging standby time of the mobile terminal.

It should be noted that, for brevity, the foregoing method embodiments are described as a series of actions. However, persons skilled in the art should be aware that the present invention is not limited to the order of the described actions, because according to the present invention, some steps may adopt other order or be performed simultaneously. Persons skilled in the art also should be aware that the described embodiments in the specification all belong to exemplary embodiments, and the involved actions are not necessarily required in the present invention.

Figure 2:
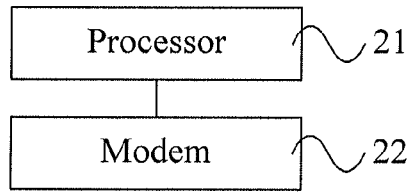
FIG. 2 is a schematic structural diagram of a mobile terminal according to another embodiment of the preset invention.

Another embodiment of the present invention provides a mobile terminal. As shown in FIG. 2, FIG. 2 is a schematic structural diagram of the mobile terminal according to another embodiment of the present invention, where the mobile terminal includes a processor 21 and a modem 22.

The processor 21 is configured to determine, according to a neighboring cell list and a reselection prohibited list, whether a cell where signal measurement needs to be performed exists;

the modem 22 is configured to, if the processor 21 determines that a cell where signal measurement needs to be performed exists, perform signal measurement on the cell where signal measurement needs to be performed and a current serving cell to obtain a measurement result; and the processor 21 is further configured to judge, according to the measurement result of the modem 22, whether a trigger condition of cell reselection is satisfied, and if the trigger condition is satisfied, trigger cell reselection executed by the modem 22;

where the neighboring cell list refers to a list formed by neighboring cells of the current serving cell; and the reselection prohibited list refers to a list formed by cells where cell reselection is prohibited.

Figure 3:
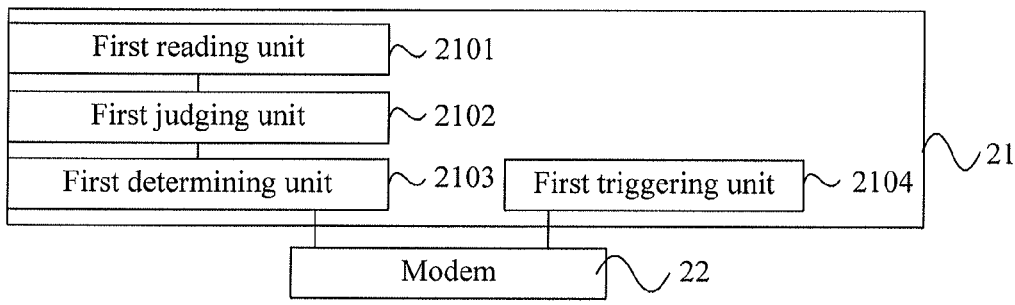
FIG. 3 is another schematic structural diagram of a mobile terminal according to another embodiment of the preset invention.

Further, as shown in FIG. 3, the processor 21 specifically includes: a first reading unit 2101, a first judging unit 2102, a first determining unit 2103, and a first triggering unit 2104, where:

the first reading unit 2101 is configured to read a cell in the neighboring cell list;

the first judging unit 2102 is configured to judge whether the cell in the neighboring cell list is included in the reselection prohibited list, where the cell in the neighboring cell is read by the first reading unit 2101;

the first determining unit 2103 is configured to, if the first judging unit 2102 judges that the cell in the neighboring cell list is not included in the reselection prohibited list, determine that a cell where signal measurement needs to be performed exists; and the first triggering unit 2104 is configured to judge, according to the measurement result of the modem 22, whether a trigger condition of cell reselection is satisfied, and if the trigger condition is satisfied, trigger cell reselection executed by the modem 22;

where the cell where signal measurement needs to be performed refers to a cell that is in the neighboring cell list but is not included in the reselection prohibited list.

Figure 4:
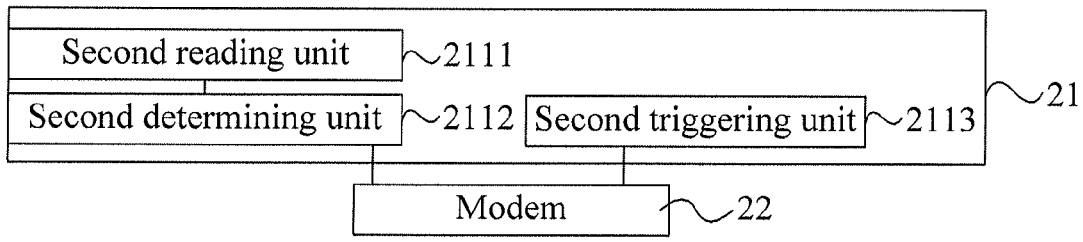
FIG. 4 is another schematic structural diagram of a mobile terminal according to another embodiment of the preset invention.

Alternatively, as shown in FIG. 4, the processor 21 specifically includes:

a second reading unit 2111, a second determining unit 2112, and a second triggering unit 2113, where the second reading unit 2111 is configured to read a reselection list;

the second determining unit 2112 is configured to, if the second reading unit 2111 reads that the reselection list includes a cell in the neighboring cell list, determine that a cell where signal measurement needs to be performed exists; and the second triggering unit 2113 is configured to judge, according to the measurement result of the modem 22, whether a trigger condition of cell reselection is satisfied, and if the trigger condition is satisfied, trigger cell reselection executed by the modem 22;

where the reselection list is determined according to the neighboring cell list and the reselection prohibited list; a cell in the reselection list refers to a cell that is included in the neighboring cell list but is not included in the reselection prohibited list; and the cell where signal measurement needs to be performed refers to a cell in the reselection list.

Further, the processor 21 is further configured to generate or update the reselection prohibited list according to the following rules, where the rules include:

(1) Add a cell where N times of reselection still does not succeed to the reselection prohibited list, where N is a positive integer that is greater than or equal to a first threshold; or (2) if within set time, M times of reselection are performed on the current serving cell and a part of cells in the neighboring cell list, add other cells except a cell with the best signal stability among the current serving cell and the part of the cells in the neighboring cell list to the reselection prohibited list, where M is a positive integer that is greater than or equal to a second threshold; or (3) if within set time, M times of reselection are performed on the current serving cell and all cells in the neighboring cell list, and the signal stability of the current serving cell is not the best among the current serving cell and all the cells in the neighboring cell list, add other cells except a cell with the best signal stability among the current serving cell and all the cells in the neighboring cell list to the reselection prohibited list, where M is a positive integer that is greater than or equal to a second threshold; or (4) if the cell where signal measurement needs to be performed exists, and the measurement result of the cell satisfies the trigger condition of cell reselection, and the cell reselection is executed, but a process of executing cell reselection on all cells that satisfy the trigger condition of cell reselection does not succeed, a cell in the reselection prohibited list is deleted from the reselection prohibited list.

If the processor 21 determines that a cell where signal measurement needs to be performed does not exist, cell signal measurement performed by the modem 22 is not triggered.

At this time, the processor 21 is further configured to generate or update the reselection prohibited list according to the following rules, where the rules include:

(5) If the signal intensity of the current serving cell is higher than set intensity, and the signal quality of the current serving cell is better than set quality, add all cells in the neighboring cell list to the reselection prohibited list; or (6) if within set time, M times of reselection are performed on the current serving cell and all cells in the neighboring cell list, and the signal stability of the current serving cell is the best among the current serving cell and all the cells in the neighboring cell list, add all the cells in the neighboring cell list to the reselection prohibited list, where M is a positive integer that is greater than or equal to a second threshold.

In the embodiments of the present invention, whether a cell where signal measurement needs to be performed exists is determined according to a neighboring cell list and a reselection prohibited list; if a cell where signal measurement needs to be performed exists, signal measurement is performed on the cell where signal measurement needs to be performed and a current serving cell to obtain a measurement result; and if the measurement result satisfies a trigger condition of cell reselection, cell reselection is triggered. Therefore, when cell reselection needs to be performed, signal measurement is no longer performed on a cell in the reselection prohibited list and unnecessary signal measurement and cell reselection are avoided, thereby decreasing power consumption of a mobile terminal and prolonging standby time of the mobile terminal.

It may be clearly understood by persons skilled in the art that, for the purpose of convenient and brief description, for a specific working process of the foregoing system, apparatus and unit, reference may be made to a corresponding process in the foregoing method embodiments, which is not described herein again.

The units described as separate parts may or may not be physically separate, and parts displayed as units may or may not be physical units, may be located in one position, or may be distributed on multiple network units. A part or all of the units may be selected according to an actual need to achieve the objectives of the solutions in the embodiments.

In addition, functional units in the embodiments of the present invention may be integrated into one processing unit, or each of the units may exist alone physically, or two or more units are integrated into one unit. The integrated unit may be implemented in the form of hardware, or may also be implemented in the form of hardware plus a software functional unit.

The integrated unit implemented in the form of a software functional unit may be stored in a computer readable storage medium. The software functional unit is stored in a storage medium to perform the steps of the methods described in the embodiments of the present invention.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features of the technical solutions, as long as these modifications or equivalent replacement do not cause the essence of corresponding technical solutions to depart from the spirit and scope of the technical solutions in the embodiments of the present invention.

What is claimed is:

1. A cell reselection method performed by a mobile terminal, comprising:
   determining, by the mobile terminal, according to a neighboring cell list and a reselection prohibited list, whether a cell on which signal measurement needs to be performed exists, wherein the cell is in the neighboring cell list but is not included in the reselection prohibited list;
   when the cell exists, performing, by the mobile terminal, the signal measurement on the cell and on a first cell currently serving the mobile terminal to obtain a measurement result; and
   when the measurement result satisfies a trigger condition of cell reselection, triggering cell reselection to select a second cell to serve the mobile terminal,
   wherein the neighboring cell list includes a plurality of neighboring cells of the first cell, and the reselection prohibited list includes a plurality of cells on which cell reselection is prohibited,
   wherein the reselection prohibited list is generated or updated based on a rule:
      after M times of reselection are performed on the first cell and a portion of the plurality of neighboring cells within a predefined time period, adding a first group of cells to the reselection prohibited list, the first group of cells includes the first cell and the portion of the plurality of neighboring cells except a cell having the best signal stability, wherein M is a positive integer that is greater than or equal to a first threshold.

2. The cell reselection method according to claim 1, wherein the determining, by the mobile terminal, according to the neighboring cell list and the reselection prohibited list, whether the cell on which the signal measurement needs to be performed exists comprises:
   reading a cell in the neighboring cell list; and
   when the cell in the neighboring cell list is not comprised in the reselection prohibited list, determining that the cell on which the signal measurement needs to be performed exists.

3. The cell reselection method according to claim 1, wherein the determining, by the mobile terminal, according to the neighboring cell list and the reselection prohibited list, whether the cell on which the signal measurement needs to be performed exists comprises:
   when a reselection list comprises a cell in the neighboring cell list, determining that the cell on which the signal measurement needs to be performed exists,
   wherein the reselection list is determined based on the neighboring cell list and the reselection prohibited list; and the cell on which the signal measurement needs to be performed includes a cell in the reselection list.

4. The method according to claim 1, wherein when it is determined that the cell on which the signal measurement needs to be performed does not exist, cell signal measurement is not performed.

5. The method according to claim 4, wherein the rules further comprising one of:
   when the signal intensity of the first cell is higher than preset intensity, and the signal quality of the first cell is better than preset quality, adding the plurality of neighboring cells to the reselection prohibited list; and
   after M times of reselection are performed on the first cell and the plurality of neighboring cells with a predefined time period, and the signal stability of the first cell is the best among the first cell and the plurality of neighboring cells, adding the plurality of neighboring cells to the reselection prohibited list, wherein M is a positive integer that is greater than or equal to a first threshold.

6. A mobile terminal, comprising:
   a modem; and
   a processor coupled to the modem, wherein the processor is configured to determine, according to a neighboring cell list and a reselection prohibited list, whether a cell on which signal measurement needs to be performed exists, wherein the cell is in the neighboring cell list but is not included in the reselection prohibited list, wherein the modem is configured to, when the processor determines that the cell exists, perform the signal measurement on the cell and on a first cell currently serving the mobile terminal to obtain a measurement result, wherein the processor is further configured to judge, according to the measurement result of the modem, whether a trigger condition of cell reselection is satisfied, and when the trigger condition is satisfied, trigger cell reselection to select a second cell to serve the mobile terminal executed by the modem, wherein the neighboring cell list includes a plurality of neighboring cells of the first cell, and the reselection prohibited list includes a plurality of cells on which cell reselection is prohibited, and wherein the processor is further configured to generate or update the reselection prohibited list based on a rule:
after M times of reselection are performed on the first cell and a portion of the plurality of neighboring cells within a predefined time period, adding a first group of cells to the reselection prohibited list, the first group of cells includes the first cell and the portion of the plurality of neighboring cells except a cell having the best signal stability, wherein M is a positive integer that is greater than or equal to a first threshold.

7. The mobile terminal according to claim 6, wherein the processor specifically comprises a first reading unit, a first judging unit, a first determining unit, and a first triggering unit, wherein:
the first reading unit is configured to read a cell in the neighboring cell list;
the first judging unit is configured to judge whether the cell in the neighboring cell list is comprised in the reselection prohibited list;
the first determining unit is configured to, when the first judging unit judges that the cell in the neighboring cell list is not comprised in the reselection prohibited list, determine that the cell on which the signal measurement needs to be performed exists; and
the first triggering unit is configured to judge, according to the measurement result of the modem, whether a trigger condition of cell reselection is satisfied, and when the trigger condition is satisfied, trigger cell reselection executed by the modem.

8. The mobile terminal according to claim 6, wherein the processor specifically comprises a second reading unit, a second determining unit, and a second triggering unit, wherein:
the second reading unit is configured to read a reselection list;
the second determining unit is configured to, when the second reading unit reads that the reselection list comprises a cell in the neighboring cell list, determine that the cell on which the signal measurement needs to be performed exists; and
the second triggering unit is configured to judge, according to the measurement result of the modem, whether a trigger condition of cell reselection is satisfied, and when the trigger condition is satisfied, trigger cell reselection executed by the modem;
wherein the reselection list is determined based on the neighboring cell list and the reselection prohibited list; and the cell on which the signal measurement needs to be performed a cell in the reselection list.

9. The mobile terminal according to claim 6, wherein:
when the processor determines that the cell on which the signal measurement needs to be performed does not exist, the processor is further configured not to trigger cell signal measurement performed by the modem.

10. The mobile terminal according to claim 9, wherein the rules further comprise one of:
when the signal intensity of the first cell is higher than preset intensity, and the signal quality of the first cell is better than preset quality, adding the plurality of neighboring cells to the reselection prohibited list; and
after M times of reselection are performed on the first cell and the plurality of neighboring cells with a predefined time period, and the signal stability of the first cell is the best among the first cell and the plurality of neighboring cells, adding the plurality of neighboring cells to the reselection prohibited list, wherein M is a positive integer that is greater than or equal to a first threshold.

11. A cell reselection method performed by a mobile terminal, comprising:
determining, by the mobile terminal, according to a neighboring cell list and a reselection prohibited list, whether a cell on which signal measurement needs to be performed exists, wherein the cell is in the neighboring cell list but is not included in the reselection prohibited list;
when the cell exists, performing, by the mobile terminal, the signal measurement on the cell and on a first cell currently serving the mobile terminal to obtain a measurement result; and
when the measurement result satisfies a trigger condition of cell reselection, triggering cell reselection to select a second cell to serve the mobile terminal,
wherein the neighboring cell list includes a plurality of neighboring cells of the first cell, and the reselection prohibited list includes a plurality of cells on which cell reselection is prohibited,
wherein the reselection prohibited list is generated or updated based on a rule:
after M times of reselection are performed on the first cell and the plurality of neighboring cells within a predefined time period, when the signal stability of the first cell is not the best among the first cell and the plurality of neighboring cells, adding a second group of cells to the reselection prohibited list, the second group of cells includes the first cell and the plurality of neighboring cells except a cell having the best signal stability, wherein M is a positive integer that is greater than or equal to a first threshold.

12. The cell reselection method according to claim 11, wherein the determining, by the mobile terminal, according to the neighboring cell list and the reselection prohibited list, whether the cell on which the signal measurement needs to be performed exists comprises:
reading a cell in the neighboring cell list; and
when the cell in the neighboring cell list is not comprised in the reselection prohibited list, determining that the cell on which the signal measurement needs to be performed exists.

13. The cell reselection method according to claim 11, wherein the determining, by the mobile terminal, according to the neighboring cell list and the reselection prohibited list, whether the cell on which the signal measurement needs to be performed exists comprises:
when a reselection list comprises a cell in the neighboring cell list, determining that the cell on which the signal measurement needs to be performed exists, wherein the reselection list is determined based on the neighboring cell list and the reselection prohibited list; and the cell on which the signal measurement needs to be performed includes a cell in the reselection list.

14. The method according to claim 11, wherein when it is determined that the cell on which the signal measurement needs to be performed does not exist, cell signal measurement is not performed.

15. The method according to claim 14, wherein the rules further comprising one of:
when the signal intensity of the first cell is higher than preset intensity, and the signal quality of the first cell is better than preset quality, adding the plurality of neighboring cells to the reselection prohibited list; and
after M times of reselection are performed on the first cell and the plurality of neighboring cells with a predefined time period, and the signal stability of the first cell is the best among the first cell and the plurality of neighboring cells, adding the plurality of neighboring cells to the reselection prohibited list, wherein M is a positive integer that is greater than or equal to a first threshold.

16. A mobile terminal, comprising:
a modem; and
a processor coupled to the modem, wherein the processor is configured to determine, according to a neighboring cell list and a reselection prohibited list, whether a cell on which signal measurement needs to be performed exists, wherein the cell is in the neighboring cell list but is not included in the reselection prohibited list,
wherein the modem is configured to, when the processor determines that the cell exists, perform the signal measurement on the cell and on a first cell currently serving the mobile terminal to obtain a measurement result, wherein the processor is further configured to judge, according to the measurement result of the modem, whether a trigger condition of cell reselection is satisfied, and when the trigger condition is satisfied, trigger cell reselection to select a second cell to serve the mobile terminal executed by the modem,
wherein the neighboring cell list includes a plurality of neighboring cells of the first cell and the reselection prohibited list includes a plurality of cells on which cell reselection is prohibited, and
wherein the processor is further configured to generate or update the reselection prohibited list based on a rule:
after M times of reselection are performed on the first cell and the plurality of neighboring cells within a predefined time period, when the signal stability of the first cell is not the best among the first cell and the plurality of neighboring cells, adding a second group of cells to the reselection prohibited list, the second group of cells includes the first cell and the plurality of neighboring cells except a cell having the best signal stability, wherein M is a positive integer that is greater than or equal to a first threshold.

17. The mobile terminal according to claim 16, wherein the processor specifically comprises a first reading unit, a first judging unit, a first determining unit, and a first triggering unit, wherein:
the first reading unit is configured to read a cell in the neighboring cell list;
the first judging unit is configured to judge whether the cell in the neighboring cell list is comprised in the reselection prohibited list;
the first determining unit is configured to, when the first judging unit judges that the cell in the neighboring cell list is not comprised in the reselection prohibited list, determine that the cell on which the signal measurement needs to be performed exists; and
the first triggering unit is configured to judge, according to the measurement result of the modem, whether a trigger condition of cell reselection is satisfied, and when the trigger condition is satisfied, trigger cell reselection executed by the modem.

18. The mobile terminal according to claim 16, wherein the processor specifically comprises a second reading unit, a second determining unit, and a second triggering unit, wherein:
the second reading unit is configured to read a reselection list;
the second determining unit is configured to, when the second reading unit reads that the reselection list comprises a cell in the neighboring cell list, determine that the cell on which the signal measurement needs to be performed exists; and
the second triggering unit is configured to judge, according to the measurement result of the modem, whether a trigger condition of cell reselection is satisfied, and when the trigger condition is satisfied, trigger cell reselection executed by the modem;
wherein the reselection list is determined based on the neighboring cell list and the reselection prohibited list; and the cell on which the signal measurement needs to be performed a cell in the reselection list.

19. The mobile terminal according to claim 16, wherein:
when the processor determines that the cell on which the signal measurement needs to be performed does not exist, the processor is further configured not to trigger cell signal measurement performed by the modem.

20. The mobile terminal according to claim 19, wherein the rules further comprise one of:
when the signal intensity of the first cell is higher than preset intensity, and the signal quality of the first cell is better than preset quality, adding the plurality of neighboring cells to the reselection prohibited list; and
after M times of reselection are performed on the first cell and the plurality of neighboring cells with a predefined time period, and the signal stability of the first cell is the best among the first cell and the plurality of neighboring cells, adding the plurality of neighboring cells to the reselection prohibited list, wherein M is a positive integer that is greater than or equal to a first threshold.

* * * * *